(12) United States Patent
van Gemert

(10) Patent No.: US 8,887,605 B2
(45) Date of Patent: Nov. 18, 2014

(54) DEVICE AND METHOD FOR DESTROYING A HARD DISK

(75) Inventor: Gerardus Theodorus Johannes van Gemert, Doornenburg (NL)

(73) Assignee: C.M.G.G. B.V., Ooij (NL)

( * ) Notice: Subject to any disclaimer, the term of this patent is extended or adjusted under 35 U.S.C. 154(b) by 626 days.

(21) Appl. No.: 13/087,930

(22) Filed: Apr. 15, 2011

(65) Prior Publication Data

US 2011/0252934 A1     Oct. 20, 2011

Related U.S. Application Data

(63) Continuation-in-part of application No. PCT/NL2009/050423, filed on Jul. 13, 2009.

(51) Int. Cl.
| | | |
|---|---|---|
| *B26D 1/08* | (2006.01) | |
| *B26D 7/02* | (2006.01) | |
| *B02C 18/22* | (2006.01) | |
| *B02C 18/02* | (2006.01) | |
| *B26D 7/20* | (2006.01) | |
| *B26D 7/06* | (2006.01) | |

(52) U.S. Cl.
CPC . *B02C 18/02* (2013.01); *B26D 7/20* (2013.01); *B02C 18/2233* (2013.01); *B26D 1/08* (2013.01); *B26D 7/0608* (2013.01)
USPC .................................. 83/382; 83/385; 83/694

(58) Field of Classification Search
USPC ........... 83/382, 156, 176, 923, 109, 167, 375, 83/383, 385, 396, 402, 451–456, 461, 690, 83/694–696, 651; 100/94
See application file for complete search history.

(56) References Cited

U.S. PATENT DOCUMENTS

| | | | | |
|---|---|---|---|---|
| 1,106,026 | A | * | 8/1914 | Barber ............................ 83/636 |
| 1,646,447 | A | | 10/1927 | Dinzl |
| 1,690,503 | A | | 11/1928 | Rhodes |
| 2,556,936 | A | | 6/1951 | Munschauer, Jr. |
| 2,821,871 | A | * | 2/1958 | Sarno ........................... 76/107.8 |
| 3,129,656 | A | | 4/1964 | Judd |
| 3,534,648 | A | * | 10/1970 | Skiera ............................ 83/694 |
| 3,926,081 | A | * | 12/1975 | Roberts ............................. 83/96 |
| 3,945,315 | A | * | 3/1976 | Dahlem et al. ................... 100/95 |
| 4,213,385 | A | | 7/1980 | Dahlem |
| 4,580,474 | A | | 4/1986 | Bueche, Sr. |
| 4,742,742 | A | * | 5/1988 | Yokoe ............................ 83/101 |
| 4,881,459 | A | | 11/1989 | Ramun |

FOREIGN PATENT DOCUMENTS

DE     1627164     12/1970

* cited by examiner

*Primary Examiner* — Phong Nguyen
(74) *Attorney, Agent, or Firm* — Vedder Price P.C.; Thomas J. Kowalski; Rebecca G. Rudich

(57) ABSTRACT

The present invention relates to a mobile device for destroying data carriers, such as hard disks. The mobile device according to the invention may include clamping means for inhibiting and/or preventing pieces of disk from being pulled out of the hard disk during the cutting. The invention also provides a corresponding method.

8 Claims, 4 Drawing Sheets

United States Patent

DEVICE AND METHOD FOR DESTROYING A HARD DISK

RELATED APPLICATIONS AND INCORPORATION BY REFERENCE

This application is a continuation-in-part application of international patent application Ser. No. PCT/NL2009/050423 filed Jul. 13, 2009, which published as PCT Publication No. WO 2010/044658 on Apr. 22, 2010.

The foregoing applications, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

The present invention relates to a mobile device and method for destroying data carriers.

BACKGROUND OF THE INVENTION

Devices for destroying data carriers are generally known. Hard disks can thus be destroyed with a shredder. Use can likewise be made of a hydraulic press which crushes the data carrier.

Such known devices are usually fixedly disposed machines. This has the drawback that the data carrier for destruction must be taken to the shredder or press. This is very undesirable in an office environment.

Citation or identification of any document in this application is not an admission that such document is available as prior art to the present invention.

SUMMARY OF THE INVENTION

An object of the present invention is to provide a mobile device for destroying a data carrier which may destroy the data carrier with sufficient certainty such that after destruction recovery of the information available on the data carrier is not possible, or at least only possible to a very limited extent.

This object is achieved with a mobile device which may include a feed device and a cutting device. The feed device may be configured to feed the data carrier to the cutting device. The cutting device may be configured to cut completely through the data carrier.

In numerous embodiments, the device may be configured to cut through hard disks. These disks generally include a metal housing with a series of concentrically placed, magnetizable disks arranged inside.

In some embodiments, a cutting device may have a knife coupled to a driver for the purpose of completely cutting through the hard disk. The mobile device may include a feed channel. The feed channel may be elongated in a feed direction. The hard disk may be moved through the feed channel towards the cutting device using a feed device.

In order to reduce the possibility of successful recovery of data, it may be advantageous for the feed device to be adapted for stepwise feed of the data carrier during operation. A further advantage can be obtained when the step size of the stepwise feed is adjustable. In the case of the hard disk this means that the disk can be cut into pieces or strips of variable dimensions. In some embodiments, the adjustability can preferably be controlled on the outside of the machine so that a user does not have to open the housing in which the cutting device and feed device are placed.

In some embodiments, the feed device may be adapted to feed the hard disk to the cutting device incrementally or in a step-wise manner along the feed direction. In some embodiments, a step size of the stepwise feeding may be adjustable.

Embodiments of the mobile device may include clamping means for inhibiting and/or preventing pieces of the hard disk from leaving the mobile device during the cutting process which are too large. In some embodiments, the clamping means may inhibit and/or prevent pieces of platters from being pulled out of the hard disk during the cutting process which are too large.

In some embodiments, the cutting device may be arranged to cut the hard disk substantially perpendicular to the feed direction. Some embodiments may include a protrusion as a clamping means. The clamping means may include blunt protrusions.

Some embodiments of the mobile device may be arranged such that a width of the feed channel and the arrangement of the blunt protrusions allows the blunt protrusions to engage the hard disk on either side of the driving shaft during operation. In some embodiments, the protrusions may be configured to deform and clamp the platters in the hard disk. In multiple embodiments, the protrusions may be configured to clamp any remaining part of the hard disk and/or platters prior to completely cutting through the hard disk.

The mobile device may be configured such that the width of the feed channel, a size of the knife, and the arrangement of the blunt protrusions allows the protrusions to engage the hard disk on either side of the driving shaft in between an upright side wall of the casing and the driving shaft during operation.

In some embodiments, the shape of the protrusions may vary. Some embodiments include protrusions having a round shape.

Embodiments of the mobile device may include a protrusion on an edge of a knife. In some embodiments, multiple protrusions may be arranged on the knife or portions thereof. In some embodiments, the knife may include multiple parts. Some embodiments may include knives having a plurality of knife parts that are arranged in a knife holder.

In some embodiments, the cutting surface of the knife may be oblique to the hard disk. Some embodiments may include a knife running obliquely downward on either side. Some embodiments may include sections of the knife surface which vary in their orientation. For example, the knife sections nearest the edge may be angled downward toward the outer edge and the knife may have a straight section near the middle of the knife. In some embodiments, the protrusions may be positioned on the straight section of the knife. For example, some embodiments may include a knife having outer sections which angle upward toward the middle of the knife and meet a straight section of the knife edge on which are arranged round protrusions.

Embodiments may include a holding means for holding the hard disk fixedly during cutting. In some embodiments, the holding means may include protrusions. In numerous embodiments, the holding means may include at least two protrusions. The holding means may include a pressing plate. In some embodiments, the protrusions may be arranged on a side of the pressing plate directed toward the hard disk.

In some embodiments, a protrusion may be an elongated structure extending along a length of the device. For example, a protrusion may be a beam-like structure. Numerous embodiments may include one or more protrusions shaped as an elongated structure.

Embodiments may include protrusions which are connectable to the pressing plate or the knife. In some embodiments, protrusions may be made of different materials than the pressing plate or the first knife, respectively.

The feed channel may include a transport surface on which the hard disk is transported towards the cutting device. In some embodiments, a transport surface may include protrusions on the surface facing the hard disk. Numerous embodiments may include protrusions in the shape of elongated structures. For example, the protrusions may be shaped like a beam extending along a length of the transport surface.

In some embodiments, a driver for the knife comprises a hydraulic press which is suitable for connection to the regular mains electricity (e.g., alternating current (AC) electric power). Some embodiments may include a hydraulic press adapted to produce a pressure force of at least 150000 N.

Embodiments may include a cutting device having a second fixedly disposed knife. In some embodiments, the first and second knife are disposed such that, during a cutting movement associated with the complete cutting through of the hard disk, the first and second knife pass at least partially alongside each other.

In some embodiments, at least one of the knives may cut into the hard disk at an angle. Embodiments may include a first knife capable of partially cutting through the hard disk.

Embodiments may include a knife made of a material having a hardness of at least 60 on the Rockwell Hardness C-Scale ("HRC"). In some embodiments, a knife may be constructed from steel with the material number 12379. Some embodiments may include materials which are neither magnetizable nor magnetic.

In some embodiments, the cutting device may be adapted to cut the hard disk into parts. Some embodiments may include a pressing device. The pressing device may be incorporated downstream of the cutting device for the purpose of deforming at least one of the parts.

Some embodiments may include a method for destroying a hard disk. The hard disk may include a plurality of platters concentrically placed around a drivable shaft. The method may include stepwise feeding of the hard disk in a feed direction to a cutting device. In some embodiments, the cutting device may include a drivable knife. The knife may be driven for the purpose of completely cutting through the hard disk substantially perpendicularly to the feed direction. In some embodiments, the hard disk may include clamping the hard disk in order to prevent pieces which are too large being pulled out of the hard disk during the cutting. In some embodiments, during clamping the hard disk may be engaged by protrusions on either side of the driving shaft to thereby deform and clamp the platters in the hard disk or in the remaining part thereof prior to the complete cutting through of the hard disk.

According to the invention the mobile device comprises a feed device and a cutting device, wherein the feed device is disposed for the purpose of feeding the data carrier in a feed direction to the cutting device, and wherein the cutting device is adapted to cut completely through the data carrier. Cutting completely through the data carrier makes recovery of data on the cut-through data carrier considerably more difficult.

In an embodiment, the cutting device comprises a first knife connected to a driver for the purpose of completely cutting through the data carrier perpendicularly of the feed device. During the cutting movement of the knife caused by the driver, the knife follows a path. The feed device is now set such that the data carrier is carried into this path such that the path lies perpendicularly of the data carrier. In the case of a hard disk it is advantageous if the cut in the disk is made on the upper and/or lower side thereof, i.e. one of the two larger surfaces.

The driver of the knife may include a hydraulic press. A hydraulic press has the advantage that much pressure force can be generated within a limited space. It is a further advantage if this press is adapted for connection to the regular mains electricity.

Within the context of the present application the term regular mains electricity is understood to mean the power supply accessible in a normal office environment or dwelling. The object of the present invention is to provide a mobile device for destroying a data carrier. This device can preferably be used in the above-mentioned office environment or dwelling. If such a device could only be used by being connected to for instance a power current connection, the device would have very little flexibility. The term regular mains electricity must therefore be understood to comprise only those connections which are readily accessible, and so for instance not a power current connection.

The use of the regular mains electricity implies that the mobile device can draw off less power than in the case of a power current connection. It is therefore important to use a hydraulic press which can produce sufficient force at this voltage. The hydraulic press is preferably adapted to produce a pressure force of at least 150000 N.

In some embodiments, a cutting device may include a first knife connected to a driver and a second fixedly disposed knife. The first and second knife may be positioned such that, during a cuffing movement associated with the complete cutting through of the data carrier, the first and second knife pass at least partially alongside each other. An effective cutting movement may be achieved by the cutting knives passing a small distance alongside each other.

It has been found that the form of the knife may have significant consequences for the power which the press must be able to produce to cut through the data carrier. In some embodiments, particularly advantageous cutting movement can be obtained if the form of the knife is such that the first knife cuts at least partially into the data carrier at an angle. Cutting at an angle is, for instance, possible by providing the knife with a reverse V-profile. Such a profile is characterized in that a knife with this profile cuts first into the sides of the data carrier. A further advantage of this profile is related to the construction of a hard disk. Generally, hard disks are constructed having a shaft in the centre around which the concentric magnetizable disks are placed. The material from which this shaft is made is very hard. In some embodiments, making use of a reverse V-profile allows for use of a lower power press, since the combination is sufficient to cut through hard disks. Thus, the flexibility of the machine is not impaired.

For the manufacture of the first knife a type of steel is preferably used with a hardness of at least 60 HRC. A very advantageous type of steel is known under the name of high-grade tool steel. Of this type, steel with the material number 12379 is highly suitable.

In some embodiments, the knife may include a plurality of knife parts. It is thus possible for instance for the knife parts to be placed on a knife holder. The knife holder and knife parts may be constructed of different materials. This provides the advantage that, when the knife parts become worn, only these parts have to be replaced. A reverse V-profile is possible by placing substantially beam-like knife parts at an angle to each other in a knife holder adapted for this purpose. In some embodiments, when hard steel is used for the knife the shape of the knife may have any profile. For example, when steel of predetermined hardness is used, it is not essential to apply the V-profile in the hard steel type.

In some embodiments, it may be important to select the material of the first knife, and preferably also the second knife, such that it is neither magnetizable nor magnetic. This is related to for instance the strong magnetic fields which may be present in the data carriers such as a hard disk. If the knives were magnetizable, there would be a risk of remnants of the hard disk adhering to the knife during or after cutting. The cutting device would have to be repeatedly cleaned as a result.

In order to further reduce the possibility of data being extracted from the cut parts of the data carrier, it is advantageous for a pressing device to be incorporated downstream of the cutting device. In some embodiments, this pressing device may deform the cut parts.

The present invention also provides a method for destroying a hard disk. This method comprises the steps of stepwise feed of the hard disk in a feed direction to a cutting device which comprises a drivable first knife, and driving the first knife for the purpose of completely cutting through the hard disk substantially perpendicularly of the feed direction. The method is characterized by clamping the hard disk in order to prevent pieces which are too large being pulled out of the hard disk during the cutting. The disks are preferably deformed and clamped in the hard disk or in the remaining part thereof prior to complete cutting through of the hard disk.

Accordingly, it is an object of the invention to not encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. §112, first paragraph) or the EPO (Article 83 of the EPC), such that Applicants reserve the right and hereby disclose a disclaimer of any previously described product, process of making the product, or method of using the product.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

BRIEF DESCRIPTION OF THE DRAWINGS

The following detailed description, given by way of example, but not intended to limit the invention solely to the specific embodiments described, may best be understood in conjunction with the accompanying drawings.

DETAILED DESCRIPTION OF THE INVENTION

Figure 1:
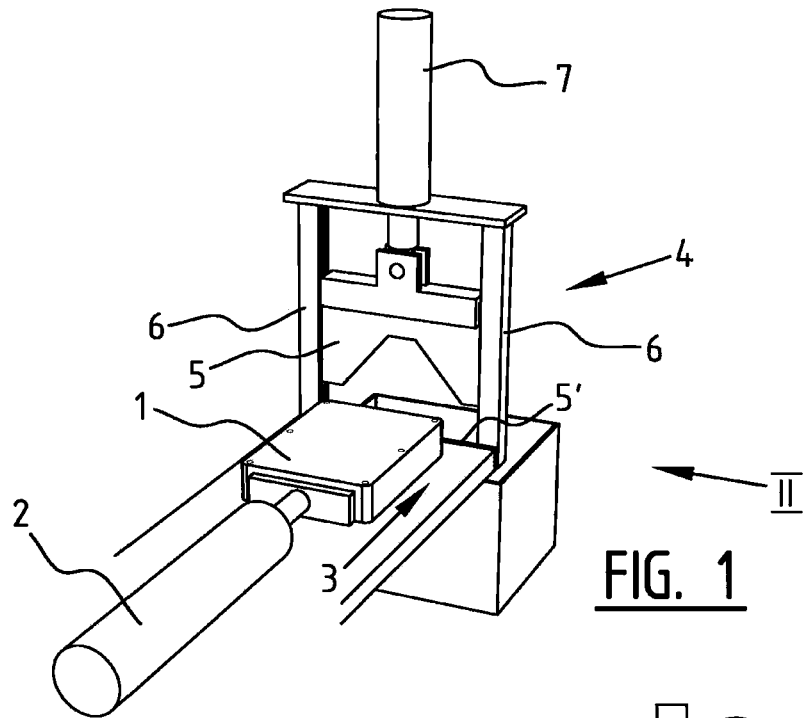
FIG. 1 is a schematic view of the general principle according to the present invention.
Figure 2:
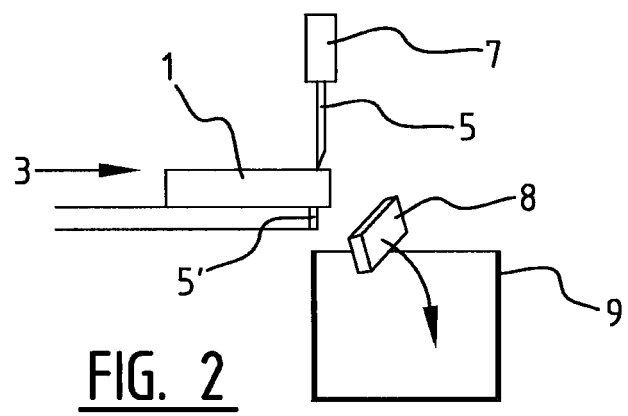
FIG. 2 is a side view according to arrow I in FIG. 1.

FIG. 1 shows schematically the general principle of the invention, while FIG. 2 shows a schematic side view according to arrow I in this figure. In FIG. 1, a hard disk 1 is advanced as according to arrow 3 in the direction of a cutting device 4 by means of a hydraulic cylinder 2 functioning as a feed device. The cutting device comprises a first knife 5 and a second knife 5'. First knife 5 is received in guides 6 and is driven by a hydraulic press 7. First knife 5 is shown in simplified manner in FIG. 1.

Figure 5:
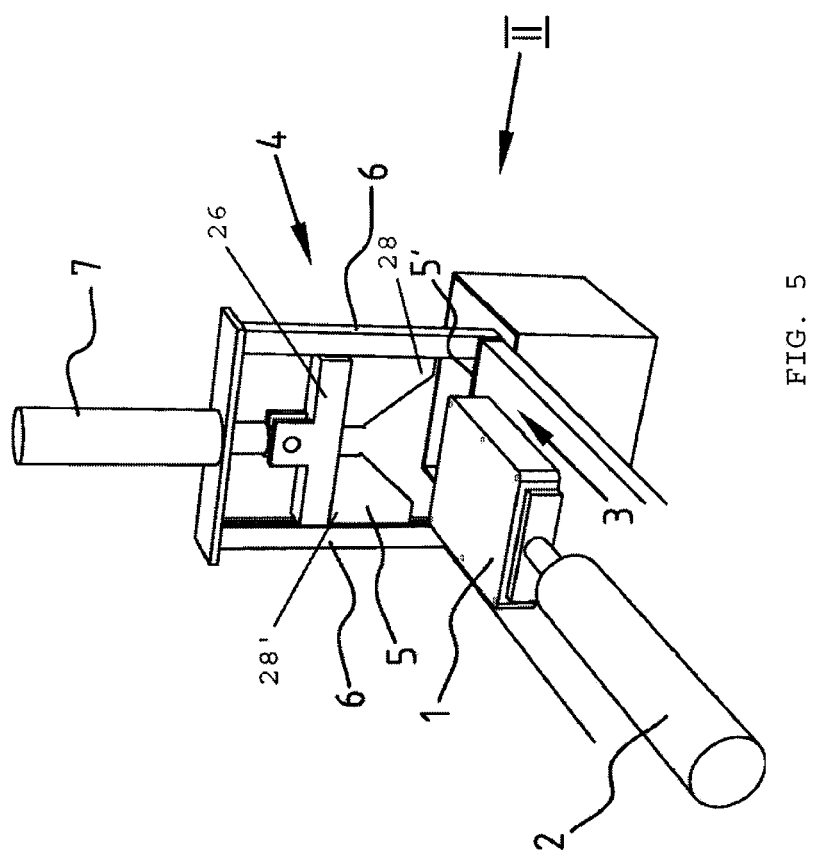
FIG. 5 is a schematic side view of an embodiment of the invention.

As shown in FIG. 5, in a favourable embodiment, use is made of a knife holder 26 to which two knife parts 28, 28' are connected. These knife parts are connected at an angle to the knife holder, whereby a reverse V-profile is created. The middle horizontal part of the knife as shown in FIG. 1 can here be largely or wholly absent as shown in FIG. 5.

Hydraulic cylinder 2 can move with discrete steps, whereby hard disk 1 can be cut into strips 8. As shown in FIG. 1, these strips are collected by means of a receiving bin 9.

The movement of first knife 5 is preferably such that the bottom side of this knife passes alongside the top side of second knife 5'. The distance between the two knives is chosen such that there is sufficient tolerance in the direction according to arrow 3 to inhibit and/or prevent the knives from making contact with each other. In an embodiment, this clearance is about 0.5 millimeters.

Figure 6:
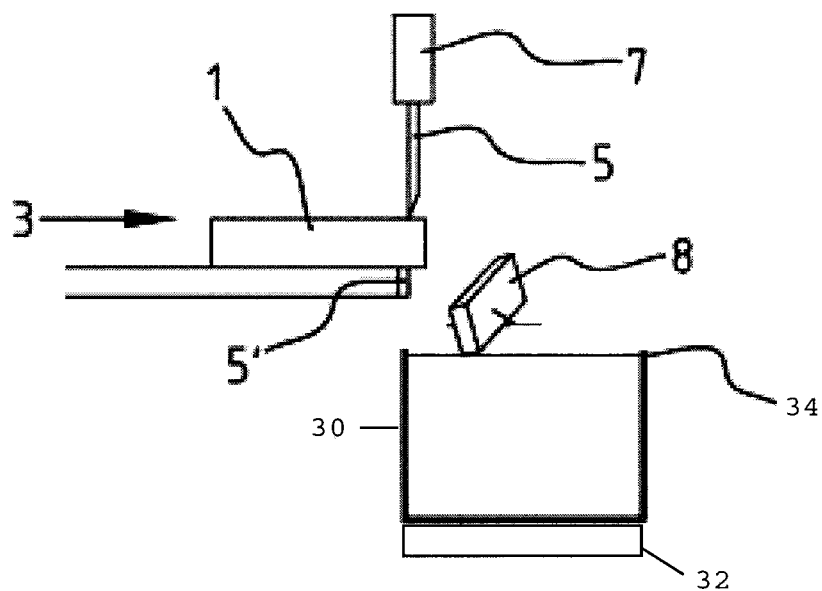
FIG. 6 is a schematic view of an embodiment of the invention.

As shown in FIG. 6, an optional addition to the above embodiment includes pressing device 30 for further deforming the cut parts 8. A possible embodiment may include a plate 32 placed behind the cutting device. After cutting the cut parts 8 fall onto the plate 32. Arranged on both sides of the plate are pressing members 34 which can move toward each other for the purpose of pressing the parts. The plate can then be pulled away or tilted, whereby the parts fall into the receiving bin 9 (shown in FIG. 2) placed below the plate.

Figure 3:
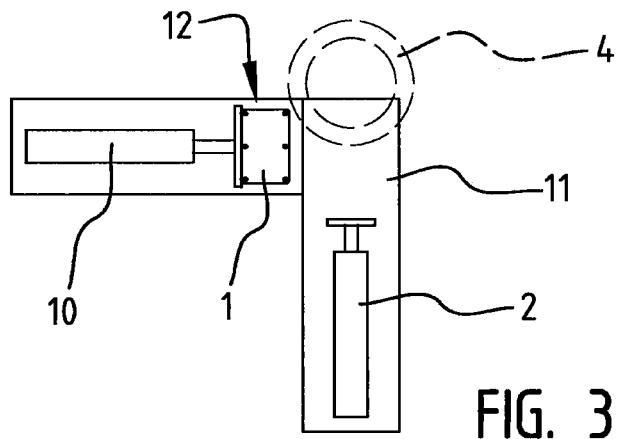
FIG. 3 is a schematic top view of an embodiment of the invention.

FIG. 3 shows a top view of the device. In addition to the above discussed hydraulic cylinder 2, this embodiment is provided with a second hydraulic cylinder 10. This cylinder places the hard disk onto a conveyor 11 in the direction of cutting device 4. The hard disk can be placed in the machine by means of a transport device (not shown), in this case a lift which transports a hard disk for destruction downward from the upper part of the machine to location 12. Hydraulic cylinder 10 will then push the hard disk to conveyor 11. Cylinder 2 then moves the hard disk in stepwise manner to the cutting device.

The device according to the invention has been developed for the physical destruction of for instance 2.5 inch and 3.5 inch hard disks, telephones, USB sticks, DVDs, Blu-Ray DVDs and tapes. As described above, destruction takes place by means of cutting, using for instance two knives, preferably by means of a knife and lower knife.

Using this cutting method disks can be cut in continuously adjustable manner into strips in a range from about 1 to about 70 millimeters. The hydraulic cylinder used for this purpose has a bore in a range between about 100 and about 125 millimeters and a stroke in a range from about 45 to about 65 millimeters, in accordance with the thickness of the disks.

In some embodiments, the hydraulic cylinder is actuated by a hydraulic unit. This is provided with a 2.2 kW motor. This motor actuates an oil pump with a capacity of 6.0 liters per minute. A stroke pressure can hereby be developed of 220 bar, this corresponding to about 17300 kilograms. As described, the cylinder drives a vertically moving knife. The hard disk or other media is held fast during cutting by a pressing plate comprising a spring assembly and/or two to three gas cartridges with a pressure force in a range between about 1500 and about 3000 kilograms. The pressure force of this spring assembly and/or gas cartridges is further absorbed by three round pillars of about 32 millimeters which prevent friction so that the spring assembly and/or the gas cartridges can be pressed downward adequately. On the pressing plate is a resilient tongue which moves up and downward so that the hard disk is still held fast during the final part of the cutting, thus preventing a large piece falling into the waste bin. The cutting knife and the spring assembly and/or gas cartridges operate independently of each other. When the cutting knife moves upward, it co-displaces the spring assembly or the gas cartridges back upward via a guide. When the cutting knife moves downward, the gas cartridges are released and will exert the set pressure force.

The displacement of the data carrier in the direction of the cutting device takes place with a spindle motor which can also develop sufficient counterforce such that the data carrier is not pressed backwards during the cutting. The whole is actuated by a servomotor which remembers all steps made so that it knows the correct position during cutting, should a displacement occur.

The cutting thickness preferably lies in a range between about 10 and about 25 millimeters, although larger cutting thicknesses are also possible, such as about 41 millimeters, this in accordance with the desired degree of destruction. The machine is suitable for 220 V, 16 A as well as for operation at 110 V. This function is possible due to the use of transformers. The 2.2 kW motor can also be connected without problem to 220 V mains electricity by placing a frequency converter which absorbs the peak voltage.

As described, the cutting into strips in a range from about 1 to about 70 millimeters takes place by means of a pushing the data carrier. After each cut the data carrier will advance a determined distance in accordance with the setting. A PLC-controlled servomotor can also be used here to operate the pushing element.

The form of the cutting knife can also be such that the knife runs obliquely upward on either side, wherein two protrusions of round shape are arranged between which the knife runs straight. This type prevents pieces of the data carrier(s) which are too large being pulled out of the cutting device during cutting.

The use of the protrusions of round shape provides particular advantages in the case of a hard disk. Such a disk comprises a plurality of magnetizable disks, referred to as platters, which are placed concentrically around a drive shaft. The round form, or at least non-sharp form compared to the rest of the knife, achieves that the platters are first deformed before being cut through. The deformation provides for a clamping action, whereby the platters are held in place during or after the cutting.

A hard disk generally includes a strong casing or cover manufactured from metal. It is advantageous if the hard disk is placed in the device such that this casing is directed toward the moving knife. In this case the deforming of the metal can contribute toward the clamping action for the purpose of holding fast the platters. The deformed metal can function here as a clamp for the platters.

By cutting through the hard disks in the above stated manner the platters are thus first deformed, whereby they are clamped in the hard disk or the remaining part thereof. This is made possible by engaging the hard disk with a relatively blunt object such as a round protrusion. The platters are cut through only after this deformation. It will be apparent to the skilled person that such a deformation can be realized not only on the knife. Protrusions or similar blunt structures can thus also be placed on the pressing plate or on the transport surface on which the disk rests. The holding of the hard disk during cutting takes place as described above with a relatively great force. Placing the protrusions or structures on these holding means also achieves that the platters are deformed and become clamped in the hard disk or the remaining part thereof.

At least two protrusions or blunt structures are preferably arranged. It is recommended here to place the protrusions such that they engage the hard disk on both sides of the shaft around which the platters are placed. Because the shaft is manufactured from very strong material, it is necessary to prevent the protrusions engaging thereon. This is possible for instance by placing the protrusions apart, each on a different side relative to the shaft. It is also the case that for an effective deformation the protrusions preferably do not engage on the side edge of the hard disk, since the upright side wall of the casing has a strengthening function in vertical direction.

Figure 4A:
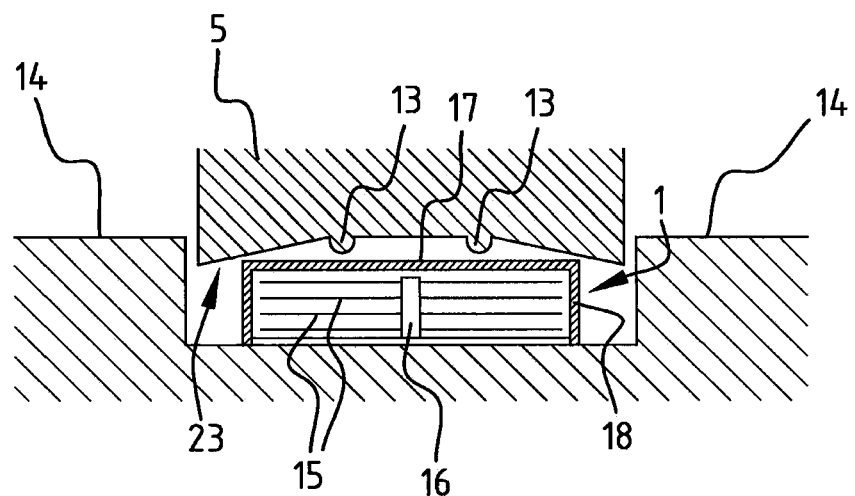
FIGS. 4A and 4B show cross-sections of two preferred embodiments of the present invention.
Figure 4B:
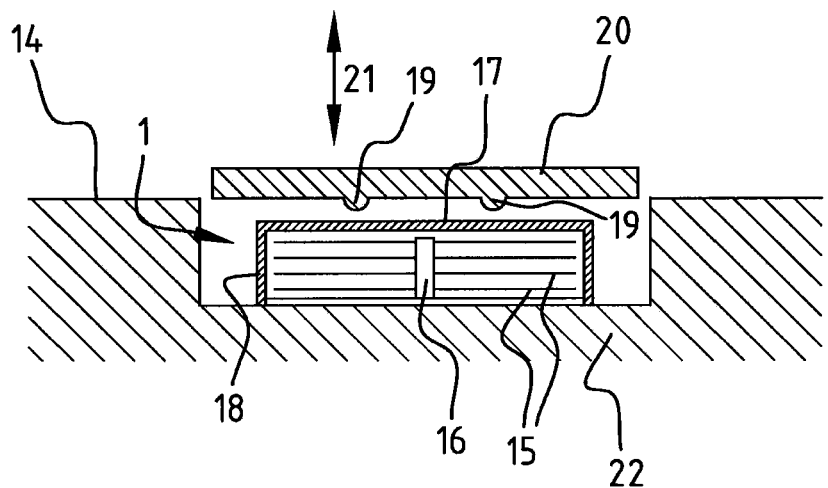

FIGS. 4A and 4B show two examples of blunt structures in the form of protrusions. In the front view of FIG. 4A the first knife 5 comprises two round protrusions 13. Likewise shown are walls 14 of the feed channel through which hard disk 1 is transported stepwise to knife 5 by means of a feed device. Because hard disk 1 is shown in cross-section, the platters 15 situated around a shaft 60 can be seen. The whole unit of platters and shaft is enclosed by a casing 17. FIG. 4A shows clearly that protrusions 13 engage hard disk 1 in an area between shaft 16 and upright side wall 18. It is also apparent that the position of hard disk 1 can vary between walls 14. The size of knife 5 and the placing of protrusions 13 thereon does however guarantee engagement between shaft 16 and upright side wall 18.

Knife 5 runs obliquely upward on either side 23. This provides the advantage that the hard disk is also pressed inward from the sides. This measure also strengthens the clamping of the platters in the hard disk or the remaining part thereof.

FIG. 4B shows a cross-section of another embodiment in which protrusions are used to deform the platters prior to cutting.

In the device of FIG. 4B two beam-like parts 19 are arranged on a side of a pressing plate 20 directed toward hard disk 1. Pressing plate 20 is movable as according to arrow 21 and serves to hold hard disk 1 fixedly during cutting. Platters 15 in hard disk 1 will be deformed by beam-like parts 19 while being held fast.

Instead of the above arrangement, or in combination therewith, beam-like parts can also be fixed to transport surface 22. In that case it can be advantageous to place hard disk 1 in the device with casing 17 directed toward transport surface 22 in order to ensure that casing 17 is likewise deformed, thereby enhancing the clamping action.

In FIGS. 4A and 4B protrusions 13 and 19 are drawn as an integral part of respectively knife 5 and pressing plate 20. It is however also possible for these protrusions to be arranged by means of a connection. It is thus also possible for the protrusions to consist of a different material, partly in view of the fact that the function thereof differs from the function of the remaining part of knife 5.

The invention is described above using one or more embodiments thereof. It will however be apparent to the skilled person that diverse modifications and additions are possible without departing from the scope of protection defined by the appended claims.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A device for destroying a hard disk, which the hard disk comprises a plurality of platters concentrically placed around a drivable shaft, the mobile device comprising:
    a cutting device having a first knife connected to a driver for completely cutting through the hard disk;
    a feed channel, elongated in a feed direction, through which the hard disk is moved towards the cutting device by means of a feed device, wherein the feed device is disposed for stepwise feeding the hard disk in the feed direction to the cutting device, wherein step sizes of the stepwise feeding are adjustable;
    clamping means for preventing pieces of platters from being pulled out of the hard disk during the cutting;
    wherein the cutting device is arranged to cut the hard disk substantially perpendicular to the feed direction;
    wherein the clamping means comprise at least two blunt protrusions, wherein a width of the feed channel and the arrangement of the blunt protrusions are such that, during operation, the at least two blunt protrusions engage the hard disk on both sides of the drivable shaft and wherein the protrusions are configured for deforming and clamping the platters in the hard disk; and
    wherein the first knife has a central horizontal section and two oblique sections extending outwardly and downwardly from both ends of the central horizontal section, and wherein the at least two protrusions are arranged on the central horizontal section.

2. The device as claimed in claim 1, wherein the at least two protrusions have a round shape.

3. The device as claimed in claim 1, wherein the first knife is formed by a plurality of knife parts that are arranged in a knife holder.

4. The device as claimed in claim 1, wherein the at least two protrusions are of different material than the first knife.

5. The device as claimed in claim 1, wherein the driver for the first knife comprises a hydraulic press, the hydraulic press being adapted to produce a pressure force of at least 150000 N.

6. The device as claimed in claim 5, wherein the hardness of the material of the first knife is at least 60 HRC, and being not magnetizable or not magnetic.

7. The device as claimed in claim 1, wherein the cutting device comprises a second fixedly disposed knife, wherein the first knife and the second fixedly disposed knife are disposed such that, during a cutting movement associated with the complete cutting through of the hard disk, the first knife and the second fixedly disposed knife pass at least partially alongside each other.

8. The device as claimed in claim 5 or 7, wherein during a cutting movement associated with the complete cutting through of the hard disk, the first knife cuts at least partially into the hard disk at an angle.

\* \* \* \* \*